United States Patent Office 3,117,162
Patented Jan. 7, 1964

3,117,162
HYDROGENATION OF NITRILES
Paul N. Rylander, Newark, and Jay G. Kaplan, Irvington, N.J., assignors, by mesne assignments, to Engelhard Industries, Inc., Newark, N.J., a corporation of Delaware
No Drawing. Filed Mar. 30, 1960, Ser. No. 18,516
2 Claims. (Cl. 260—583)

This invention relates to hydrogenation of nitriles in the presence of certain platinum metal catalysts with minimization of the coupling reaction generally found to occur in the reduction of nitriles. More particularly, it refers to such hydrogenations of aliphatic nitriles with catalysts containing rhodium or ruthenium, and such hydrogenations of aromatic nitriles with catalyst containing rhodium or palladium.

It is known that nitriles can be catalytically reduced to amines, and a variety of catalysts have been employed for this purpose. The normal product of the reaction of a nitrile should be a primary amine, $$RC\equiv N + 2H_2 \rightarrow RCH_2NH_2$$

but very frequently coupling reactions leading to secondary amines $$2RC\equiv N + 4H_2 \rightarrow (RCH_2)_2NH + NH_3$$

or tertiary amines predominate $$3RC\equiv N + 6H_2 \rightarrow (RCH_2)_3N + 2NH_3$$

The extent of the coupling reaction is mainly dependent upon the catalyst used. It is affected to some extent by the temperature and pressure of the reduction reaction, concentration of the substrate, the use of a solvent, the amount of catalyst present, and the structure of the nitrile which is reduced.

Coupling reactions are generally undesirable and wasteful of the substrate; hence many means have been employed to minimize coupling, including reduction in a very dilute solution, and the use of organic anhydrides or liquid ammonia as solvents.

The preferred reaction pressure where rhodium is used to reduce aliphatic nitriles is in the range of about 1 to 50 atmospheres, whereas for the reduction of aliphatic nitriles using ruthenium as a catalyst, reaction pressure is generally in the range of about 10 to 300 atmospheres. For reduction of aromatic nitriles with either rhodium or palladium as a catalyst, the preferred reaction pressure is in the range of about 1 to 50 atmospheres.

The reaction may be conducted in the presence or the absence of a solvent, and where a solvent is employed, it should be one which does not poison the catalyst. Suitable solvents are benzene, acetic acid, butyl alcohol, hexane and the like. The solvent may be present in a ratio of 1 to 99 percent by weight of the substrate. The catalytic metals, i.e. rhodium, palladium, or ruthenium may be used in the form of their blacks. Preferably, they are supported on carriers such as, for example, carbon, alumina, including activated alumina, silica, including kieselguhr and synthetic gel, titanium dioxide, calcium carbonate, barium sulfate, bentonite and the like. The preferred supported catalysts include a catalytic metal content in the range of about 0.1 to 10 percent by weight of the total catalyst, but catalysts having a higher metal content can be used if desired.

The method of preparation of the catalyst will vary depending upon the type of process in which it is to be employed. When the precious metal is dispersed throughout a macro-size support or is present with the support in a powder form, it is customary to co-precipitate it with the support, or to use various impregnation methods. For example, aluminum hydrate and rhodium sulfide may be co-precipitated by adding a solution of ammonium hydroxide and ammonium sulfide to a solution of aluminum chloride and a soluble compound of rhodium. The resulting precipitate is then washed free of chloride, dried and calcined to produce an active catalyst. Alternatively, a finely divided catalyst support, or support precursor, may be mixed with water and impregnated with an aqueous solution of a precious metal salt. The precious metal may be fixed on the support as such, or as an insoluble sulfide prior to drying. In the case of a carbon support, it is usually unnecessary to calcine the catalyst, while in the case of an inorganic support such as an oxide hydrate, it is generally beneficial to calcine it prior to use. This calcination is most conveniently effected in air.

In the case of macro-size catalysts for use in fixed bed or moving bed reactors, it is often desirable to have the catalytic metal dispersed on the external surface of the particles. In the case of an adsorbent support, this is most readily accomplished by soaking the support in an aqueous solution of a precious metal salt. The catalyst is then dried and activated by air calcination. For example, ¼-inch activated alumina tablets may be soaked in a solution of a soluble salt of rhodium so as to provide 0.5 percent rhodium on an alumina base. The rhodium salt is adsorbed on the external surface of the particles, after which the particles are dried at a temperature of 120° C. and calcined for two hours at a temperature of 480° C. to provide an active catalyst.

Catalysts for use in fluidized beds or slurry systems are provided as fine powders, usually having a particle size in the range of about 5 to 100 microns. Catalysts for fixed bed or moving bed processes are provided as macro-size particles, usually from 1/16 to ⅜-inch in diameter, and having a length approximately equal to the diameter. In the latter case, the particles may be formed by a tabletting or extrusion operation prior to or after impregnation with the catalytic metal.

It is usually preferable to prereduce ruthenium catalysts in a hydrogen atmosphere prior to use.

The process of the present invention may be conducted in either the liquid or vapor phase and, where the vapor phase is employed, the space velocity may be in the range of about 0.1 to 50 standard volumes of gas per volume of catalyst per hour, preferably 0.5 to 10 standard volumes per volume per hour.

The concentration of catalyst relative to material to be hydrogenated, in liquid phase operation, may be in the range of 0.01 to 20 grams of the compound to be hydrogenated per gram of catalyst, preferably 0.5 to 5 grams per gram.

The reaction temperature for liquid phase reactions may be in the range of 0 to 250° C., and for vapor phase reactions, from about 100 to 400° C.

A study was made using propionitrile to ascertain the effect of concentration on product distribution. Propionitrile in 4.4 volume percent, 8.4 volume percent, 15.5 volume percent and 26.8 volume percent in hexane was hydrogenated, using 300 mg. of 5 percent rhodium on carbon catalyst, at a temperature of 25° C. and a pressure of 50 p.s.i.g. The most dilute solution favored primary amine formation, but the secondary amine generally predominated. At other concentrations, all the amine is secondary. Generally speaking, substrate concentration does not have a significant effect upon product distribution.

A study was made of the effect of catalyst concentration on the distribution of amine in the hydrogenation of propionitrile, using a 5 percent rhodium on carbon catalyst. There was a small amount of primary amine formed, using small amounts of catalyst but, otherwise, distribution was virtually independent of the amount of catalyst present, indicating that coupling occurs primarily on the catalyst surface.

Another study was made of the effect of mixing the catalyst on the distribution of amines. Platinum poisoned easily, and 300 mg. of 5 percent platinum on carbon was generally insufficient to completely hydrogenate the nitrile. When the reactor was opened and more platinum on carbon catalyst was added, the reaction continued further. However, tertiary amine was the only amine found in these two experiments. If 5 percent rhodium on carbon catalyst is added to the spent platinum catalyst, which has become inactive due to poisoning, the reaction continues to completion, but the product is solely tertiary amine instead of containing a substantial amount of secondary amine which the rhodium catalyst should yield.

Another study was made of the effect of excess product on the direction taken in the hydrogenation of propionitrile. It was observed that primary amine poisoned the catalyst whereas the use of secondary amine as a solvent promoted the formation of tertiary amine. No primary or secondary amine formed when tertiary amine was used as a solvent; presumably tertiary amine is formed, but it could not be measured. It appears that the use of an amine solvent does not promote the formation of primary amine.

The invention will be further illustrated by reference to the following specific examples:

EXAMPLE I

A study was made of the hydrogenation of propionitrile at room temperature and atmospheric pressure, using various platinum metals catalysts. In each of these tests, 300 mg. of catalyst were placed in a one-liter heavy wall Erlenmeyer flask, together with 50 ml. of hexane containing 0.1 mole of propionitrile. The flask was placed in a shaker, capped and repeatedly evacuated and filled with hydrogen gas. The system was then connected to a gas burette and leveling bulb containing water, in order to measure hydrogen uptake. The shaker was started and the hydrogen reacted was measured on the gas burette at various intervals of time.

Results of these tests are shown in Table I below.

It can be readily seen from the table that, under conditions in which palladium and platinum give exclusively tripropyl amine, rhodium gives predominately dipropyl amine, thus demonstrating that rhodium has an unexpectedly small tendency to promote coupling. The percentages in the table express the percentage of each amine as a total of all the primary amines.

Table I.—Hydrogenation of Propyl Nitrile in Hexane at 25° C.

| Catalyst | Distribution of Amine | | | Ml. H₂/ min. per 300 mg. of cat. |
|---|---|---|---|---|
| | Percent Propyl amine | Percent Dipropyl amine | Percent Tripropyl amine | |
| 5% Pd as PdO on Mg silicate | 0 | 0 | 100 | |
| 5% Pd on Mg silicate | 0 | 0 | 100 | |
| 5% Pt on carbon (Norit A) | 0 | 0 | 100 | 0.8 |
| 5% Pd as PdO on carbon (Norit Sg Ex) | 0 | 0 | 100 | |
| 5% Pd on acid leached carbon (Norit F) | 0 | 0 | 100 | |
| 5% Pt on carbon (Norit Sg Ex) | 0 | 0 | 100 | |
| 5% Pd on carbon (Norit Sg Ex) | 0 | 0 | 100 | 1.0 |
| 5% Pd on carbon (Darco G-60) | 0 | 0 | 100 | 1.5 |
| 2.5% Pd, 2.5% Ru on carbon (Norit) | 0 | 31 | 69 | 3.7 |
| 0.5% Rh on Al₂O₃ powder | | >90 | | 6 |
| 1.0% Rh on Al₂O₃ powder | 0 | 100 | 0 | 8.1 |
| 2.0% Rh on Al₂O₃ powder | 0.5 | >90 | 0 | 4 |
| 5.0% Rh on carbon (Darco G-60) | 4.5 | 95.5 | 0 | 4.6 |
| 30% Rh on carbon (Norit) | 16 | 84 | 0 | 10 |
| 5% Rh on carbon (Norit) | 0 | 100 | 0 | 11 |
| 5% Rh on asbestos | 0 | 100 | 0 | 1.2 |
| 5% Rh on CaCO₃ | | >90 | | 4 |

EXAMPLE 2

The hydrogenation of propionitrile to amines was studied with various Pt metal on carbon carrier catalysts at different pressures. In each case an ambient temperature of about 25° C. was used. For 50 p.s.i.g. determination, the rate of hydrogen uptake in a shaking bomb was measured by the drop in pressure. For the 500 p.s.i.g. and 1000 p.s.i.g. determinations, rocking autoclaves were used, with the rate of hydrogen uptake likewise being measured by the drop in pressure. For each experiment, 300 mg. of powdered catalyst, having a carbon carrier, were used, together with 50 ml. of hexane and 0.1 mole of propionitrile.

Results are shown in Table II below.

In no case do the percentages of amine found add to 100 percent. This is attributed to the formation of intermediates such as

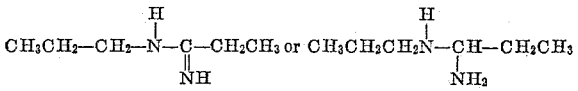

which have no absorbance at 6.20, 8.83 or 8.40μ.

Table II.—Hydrogenation of Propionitrile
EFFECT OF METAL AND PRESSURE ON PRODUCT DISTRIBUTION

| Catalyst | Compound | 50 p.s.i.g. | | 500 p.s.i.g. | | 1000 p.s.i.g. | |
|---|---|---|---|---|---|---|---|
| | | Conv. (percent) | Yield (percent) | Conv. (percent) | Yield (percent) | Conv. (percent) | Yield (percent) |
| 5% Rh/C | Nitrile | 100 | | 100 | | 100 | |
| | 1° Amine | 3 | 3 | 0 | 0 | 0 | 0 |
| | 2° Amine | 81 | 89 | 92 | 92 | 94 | 94 |
| | 3° Amine | 0 | 0 | 0 | 0 | 0 | 0 |
| 5% Pd/C | Nitrile | 93 | | 59 | | 75 | |
| | 1° Amine | 0 | 0 | 0 | 0 | 0 | 0 |
| | 2° Amine | | 0 | | 0 | | 0 |
| | 3° Amine | 74 | 84 | 53 | 78 | 49 | 57 |
| 5% Pt/C | Nitrile | 32 | | 37 | | 22 | |
| | 1° Amine | 0 | 0 | 0 | 0 | 0 | 0 |
| | 2° Amine | 0 | 0 | 0 | 0 | 0 | 0 |
| | 3° Amine | 21 | 67 | 16 | 38 | 13 | 61 |
| 5% Ru/C | Nitrile | 0 | | 100 | | 100 | |
| | 1° Amine | 0 | 0 | 21-37 | 21-37 | 10-18 | 10-18 |
| | 2° Amine | 0 | 0 | 24 | 24 | 34 | 34 |
| | 3° Amine | 0 | 0 | | | 0 | 0 |

EXAMPLE 3

A study was made of the effect of temperature on distribution of amines resulting from the hydrogenation of propionitrile. Conditions used were 50 p.s.i.g. with the reaction being conducted in the shaking bomb previously described. 0.1 mole propionitrile in 50 ml. hexane was reacted with hydrogen over 300 mg. of powdered catalyst in each case.

Results are shown in Table III below.

In the range of 25° C. to 150° C., it was not observed that temperature had a marked effect on distribution. The trend, most noticeably with Rh, is toward randomization with increasing temperature.

*Table III.—Hydrogenation of Propionitrile*
EFFECT OF TEMPERATURE ON DISTRIBUTION ON AMINES

| Catalyst | Temp., °C. | Nitrile | | 1° Amine ($-NH_2$) | | 2° Amine ($>NH$) | | 3° Amine ($>N-$) | |
|---|---|---|---|---|---|---|---|---|---|
| | | Conv. (percent) | Yield (percent) | Conv. (percent) | Yield (percent) | Conv. (percent) | Yield (percent) | Conv. (percent) | Yield (percent) |
| 5% Rh/C | 25 | 100 | | 3 | 3 | 89 | 89 | 0 | 0 |
| | 80 | 100 | | 2 | 2 | 86 | 86 | 0 | 0 |
| | 150 | 100 | | 3 | 3 | 71 | 71 | 19 | 19 |
| 5% Pd/C | 25 | 93 | | 0 | 0 | 0 | 0 | 74 | 84 |
| | 80 | 100 | | 0 | 0 | 0 | 0 | 90 | 90 |
| | 150 | 100 | | 0 | 0 | 0 | 0 | 95 | 95 |
| 5% Pt/C | 25 | 32 | | 0 | 0 | 0 | 0 | 21 | 67 |
| | 80 | 50 | | 0 | 0 | 0 | 0 | 45 | 90 |
| | 150 | 69 | | 0 | 0 | 0 | 0 | 52 | 88 |
| 5% Ru/C | 25 | 0 | | 0 | 0 | 0 | 0 | 0 | 0 |
| | 80 | 100 | | 17–35 | 17–35 | 26 | 26 | 0 | 0 |
| | 150 | 100 | | 28 | 28 | 53 | 53 | 0 | 0 |

EXAMPLE 4

A study was made of the effect of varying the solvent, using a shaking bomb at 25° C. and 50 p.s.i.g. As before, 0.1 mole of proprionitrile was hydrogenated in 50 ml. of hexane, the catalyst being 300 mg. of 5 percent Rh on carbon.

Results are shown in Table IV below.

These results show that carbon tetrachloride, chloroform, dioxane and pyridine poisoned the cataylst. The other four solvents, namely, benzene, acetic acid, butyl alcohol and hexane, gave approximately the same amine distribution; none gave a good yield of primary amine. Analysis was by infrared absorption. Some solvents interfered with the amine absorption bonds; in the table they are indicated as "blocked out."

*Table IV.—Effect of Distribution Using Various Solvents With 300 mg. of 5 Percent Rh on Carbon at 50 p.s.i.g.*

| Solvent | Nitrile | | Primary amine | | Secondary amine | | Tertiary amine | |
|---|---|---|---|---|---|---|---|---|
| | Conv. (percent) | Yield (percent) | Conv. (percent) | Yield (percent) | Conv. (percent) | Yield (percent) | Conv. (percent) | Yield (percent) |
| Carbon tetachloride | 0 | | 0 | 0 | 0 | 0 | 0 | 0 |
| Chloroform | 0 | | 0 | 0 | 0 | 0 | 0 | 0 |
| Dioxane | 0 | | 0 | 0 | 0 | 0 | 0 | 0 |
| Pyridine | 0 | | 0 | 0 | 0 | 0 | 0 | 0 |
| Benzene | 41 | | Weak | Weak | Present | Present | 0 | 0 |
| Acetic acid | (1) | | 0 | 0 | Present | Present | 0 | 0 |
| Butyl alcohol | 35 | | Weak | Weak | (2) | (2) | (2) | (2) |
| Hexane | 100 | | 3 | 3 | 89 | 89 | 0 | 0 |

[1] Incomplete. [2] Blocked out.

EXAMPLE 5

A study was made of the hydrogenation of benzonitrile at various pressures. In the 50 p.s.i.g. study the shaking bomb was used, and for the 500 and 1000 p.s.i.g. studies, rocking autoclaves were used. In each case hydrogen reacted was determined by pressure drop. 0.1 mole of benzonitrile in 50 ml. of hexane was hydrogenated over 300 mg. of catalyst in each case.

Results are shown in Table V below.

These results show a product quite unlike that found for propionitrile. With benzonitrile the primary amine

*Table V.—Distribution of Amine in Benzonitrile Hydrogenation*

| Catalyst | Pressure, p.s.i.g. | Nitrile | | Primary amine | | Secondary amine | | Tertiary amine | |
|---|---|---|---|---|---|---|---|---|---|
| | | Conv. (percent) | Yield (percent) | Conv. (percent) | Yield (percent) | Conv. (percent) | Yield (percent) | Conv. (percent) | Yield (percent) |
| 5% Rh/C | 50 | [1] 29 | | 0 | 0 | 0 | 0 | 0 | 0 |
| | 500 | [1] 100 | | 13 | 13 | 33 | 33 | 0 | 0 |
| | 1,000 | [1] 100 | | 33 | 33 | 68 | 68 | 0 | 0 |
| 5% Pd/C | 50 | 90 | | 45 | 50 | 62 | 68 | 0 | 0 |
| | 500 | 100 | | 55 | 55 | 49 | 49 | 0 | 0 |
| | 1,000 | 100 | | 55 | 55 | 52 | 52 | 0 | 0 |
| 5% Pt/C | 50 | 38 | | 7 | 18 | 42 | 110 | 0 | 0 |
| | 500 | 57 | | 5 | 9 | 60 | 105 | 0 | 0 |
| | 1,000 | 43 | | 0 | 0 | 53 | 122 | 0 | 0 |
| 5% Ru/C | 50 | 0 | | 0 | 0 | 0 | 0 | 0 | 0 |
| | 500 | [1] 16 | | 0 | 0 | 0 | 0 | 0 | 0 |
| | 1,000 | | | | | | | 0 | 0 |

[1] Imine ($>C=NH$) band present.

always forms an appreciable percentage of the amines present. No tetiary amine was found at all. Pt produces the most secondary amine, whereas Rh gave more secondary amine in the aliphatic hydrogenations. Pd is best for forming primary amine; it gave exclusively tertiary amine with propionitrile. No ring hydrogenation was observed. In the case of the Rh and Ru hydrogenations some imine (>C=NH) was present.

It will be obvious to those skilled in the art that many modifications may be made within the scope of the present invention without departing from the spirit thereof, and the invention includes all such modifications.

What is claimed is:

1. A process for the preparation of dipropylamine by catalytic hydrogenation of propionitrile which process comprises contacting a solution of propionitrile in an inert solvent with hydrogen at a temperature between 0° and 80° C. and a pressure between atmospheric and 1000 p.s.i.g. in the presence of a supported catalyst consisting essentially of from 0.1% to 10% by weight rhodium on a support, and separating dipropylamine as the sole substantial reaction product.

2. The process of claim 1 wherein the solvent is hexane.

References Cited in the file of this patent

UNITED STATES PATENTS

| | | |
|---|---|---|
| 2,165,515 | Schmidt | July 11, 1939 |
| 2,166,971 | Schmidt et al. | July 25, 1939 |
| 2,647,146 | Arthur | July 28, 1953 |
| 2,690,456 | Renfrew et al. | Sept. 28, 1954 |
| 2,784,230 | Ferstandig | Mar. 5, 1957 |
| 2,864,863 | Young | Dec. 16, 1958 |

OTHER REFERENCES

Freifelder et al.: Jour. Am. Chem. Soc., vol. 82, page 696 (Feb. 5, 1960).